(No Model.)  4 Sheets—Sheet 1.

J. W. BLODGETT.
TACKING ATTACHMENT FOR SEWING MACHINES.

No. 477,636. Patented June 28, 1892.

Witnesses:
John L. Jackson
W. Rossiter

Inventor:
John W. Blodgett
by Bond & Adams
attys.

(No Model.) 4 Sheets—Sheet 2.
J. W. BLODGETT.
TACKING ATTACHMENT FOR SEWING MACHINES.
No. 477,636. Patented June 28, 1892.
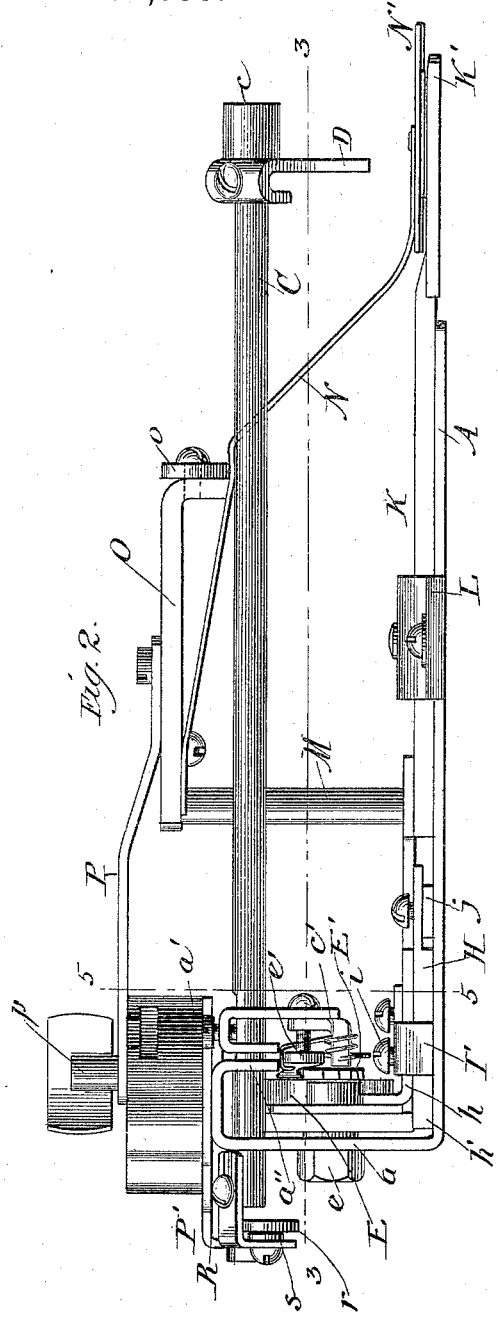
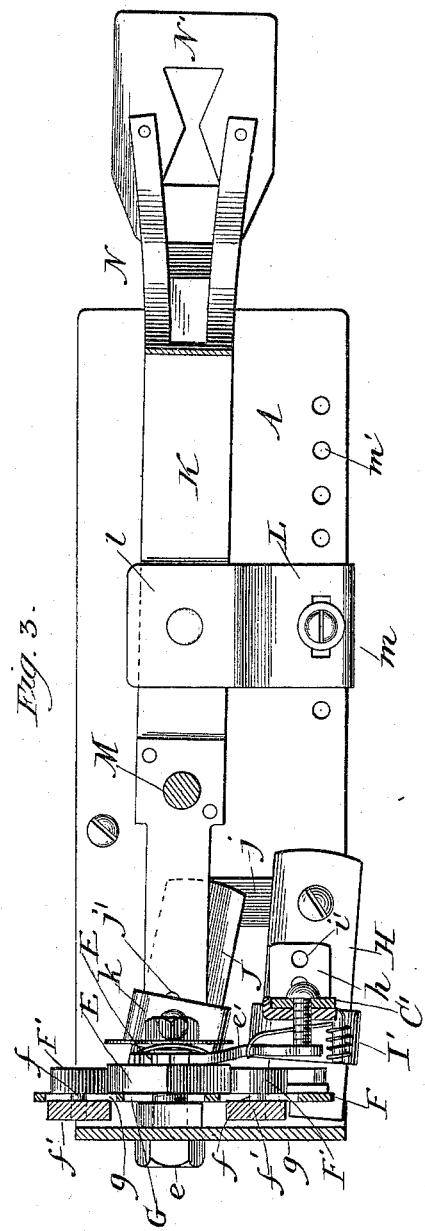
Witnesses:
John L. Jackson
W. Rossiter
Inventor:
John W. Blodgett
by Bond & Adams
attys.

(No Model.) 4 Sheets—Sheet 3.
J. W. BLODGETT.
TACKING ATTACHMENT FOR SEWING MACHINES.
No. 477,636. Patented June 28, 1892.
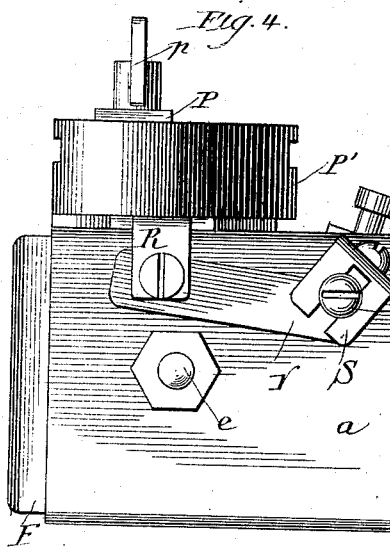
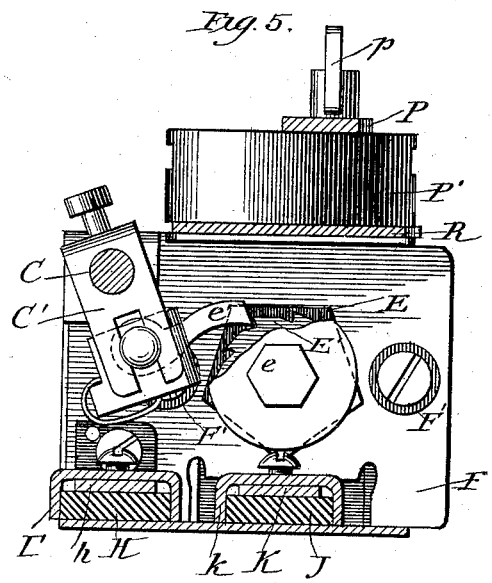
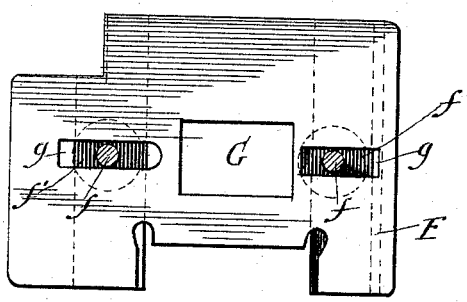
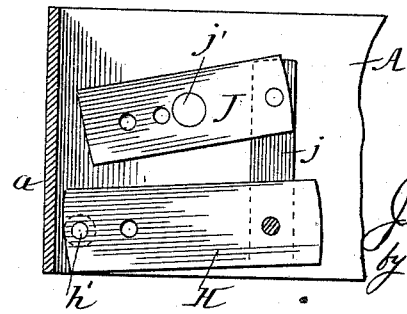
Witnesses:
John L. Jackson
W. Rossiter
Inventor:
John W. Blodgett
by Bond & Adams
Attys (No Model.)  4 Sheets—Sheet 4.

J. W. BLODGETT.
TACKING ATTACHMENT FOR SEWING MACHINES.

No. 477,636. Patented June 28, 1892.

Witnesses.

Inventor
John W. Blodgett,
By
Bond & Adams
Attys.

UNITED STATES PATENT OFFICE.

JOHN W. BLODGETT, OF CHICAGO, ILLINOIS, ASSIGNOR TO HIMSELF AND THE ABBOTT MACHINE COMPANY, OF SAME PLACE.

TACKING ATTACHMENT FOR SEWING-MACHINES.

SPECIFICATION forming part of Letters Patent No. 477,636, dated June 28, 1892.

Application filed April 13, 1891. Serial No. 388,662. (No model.)

*To all whom it may concern:*

Be it known that I, JOHN W. BLODGETT, a citizen of the United States, residing at Chicago, county of Cook, State of Illinois, have invented a new and useful Improvement in Tacking Attachments for Sewing-Machines, of which the following is a specification, reference being had to the accompanying drawings, in which—

Figure 1:
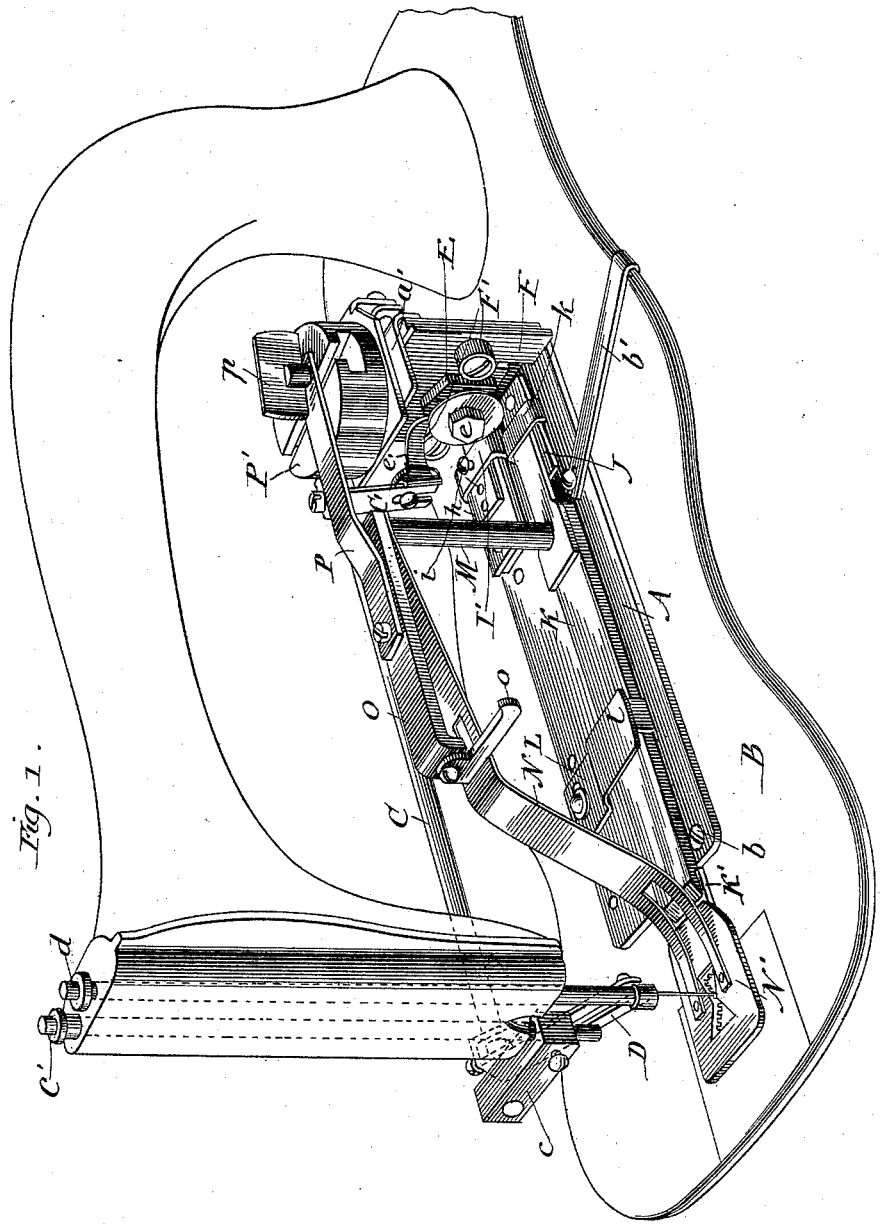
Figure 9:
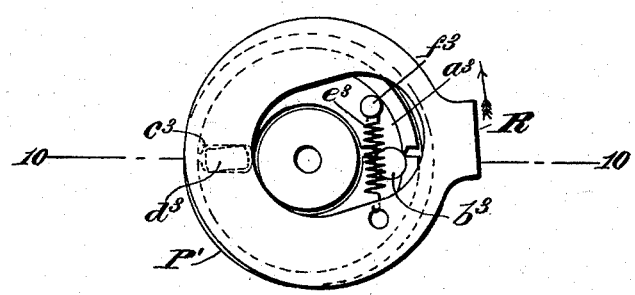
Figure 10:
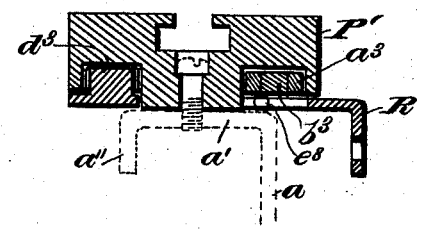
Figure 11:
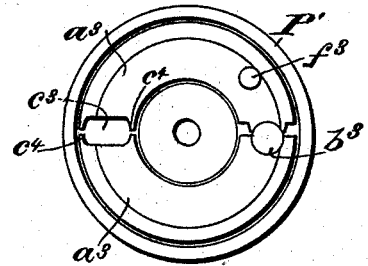

Figure 1 is a perspective view showing the attachment in position for work. Fig. 2 is a side elevation. Fig. 3 is a horizontal section on line 3 3 of Fig. 2. Fig. 4 is an end elevation. Fig. 5 is a vertical section on line 5 5 of Fig. 2. Fig. 6 is a detail, being an elevation of the sliding plate. Fig. 7 is a detail showing one of the swinging levers. Fig. 8 is a diagram showing the form of stitch. Fig. 9 is a detail bottom plan view of the rotating clutch head or shell. Fig. 10 is a sectional view of the same, taken on the line 10 10, Fig. 9; and Fig. 11 is a bottom plan view of the clutch head or shell, omitting the actuating-lever.

This invention relates to attachments for sewing-machines.

The object of this invention is to provide an improved device for making tacks, which I accomplish as illustrated in the drawings and as hereinafter described. Many of the devices and parts employed in this attachment are also employed in the buttonhole attachment for sewing-machines for which I made application for Letters Patent April 13, 1891, Serial No. 388,661.

Those things which I claim in the present application will be pointed out in the claims.

Similar letters of reference refer to similar parts in the several views.

The main plate A of the attachment is secured to the cloth-plate B of the sewing-machine by a screw $b$ and attaching-strap $b'$, as best shown in Fig. 1. The plate A consists of a horizontal portion, which is attached to the cloth-plate B, a vertical portion $a$, and the horizontal portion $a'$, which on one side has a depending portion $a''$, as shown in Fig. 2. The operating rock-shaft C is supported at its rear end in the vertical portions $a$ $a''$, (shown in Fig. 2,) and at its forward end this shaft C is supported in a bearing-block $c$. This block is attached to the presser-bar $c'$ of the sewing-machine by a set-screw, as shown in Fig. 1.

Upon the outer end of the shaft C is secured a forked arm D, which is arranged to engage with a pin or other projection upon the needle-bar $d$. By means of this forked arm D the shaft C is rocked by the needle-bar $d$.

Upon the vertical portion $a$ of the plate A is secured a pivot-bolt $e$, upon which bolt is mounted a cam-wheel E. This cam-wheel E, as shown in Fig. 5, is a five-sided wheel.

A ratchet-wheel E' is secured to or made integral with the cam-wheel E. This ratchet-wheel is provided with ten teeth in the construction shown for purposes hereinafter set forth. This ratchet-wheel E' is rotated one tooth at a time by a spring-pawl $e'$, which is mounted upon an arm C', secured to the shaft C, as shown in Figs. 2 and 5.

A sliding plate F is placed between the vertical portion $a$ and the cam-wheel E, as shown in Figs. 2 and 3. Upon the plate F are mounted two anti-friction rollers F', as best shown in Figs. 3 and 5. I mount these anti-friction rollers upon screw-bolts $f$, which are secured in plates $f'$. These bolts $f$ pass through slots $g$ in the plate F, so that the plates $f'$ and bolts $f$ can be adjusted on the plate F for purposes which will hereinafter appear.

Upon each downward movement of the arm D the spring-pawl $e'$ is drawn backwardly a distance of one tooth in the ratchet-wheel E', and upon each upward stroke of the arm D the spring-pawl $e'$ will move the ratchet-wheel E' forward one notch.

The wheel E is so arranged between the rollers F' that when one side of the wheel engages with one roller F' one of the projecting corners will engage with the other roller F'. When the ratchet-wheel E' is moved one tooth, the cam-wheel E will be turned so as to bring the side against one roller and the corner against the other roller, thereby causing the plate F to slide. Upon moving the ratchet-wheel E' the interval of another tooth the plate F will be caused to slide in the opposite direction. The plate F is provided with a slot G, as shown in Fig. 6, through which the bolt $e$ passes, so as to permit the plate F to slide.

The sliding plate F is provided with an arm $h$, as shown in Fig. 2. A swinging lever H is pivoted at $h'$ to the plate A, and the arm $h$ is pivotally connected therewith by a guide I', which is secured to the arm $h$ by a screw $i$. The arm $h$ is provided with a number of adjusting-holes $i'$ for adjusting the pivotal point of the arm $h$ and lever H. The forward end of the lever H is connected by a link $j$ with a lever J. The lever J at $j'$ is pivotally connected to the plate A. Each movement of the sliding plate F will cause the lever H to swing, and each movement of the lever H through the link $j$ will cause the lever J to swing. The amount of each movement of the lever H, and consequently of the lever J also, can be varied by means of the screw $i$ and adjusting-holes $i'$ in the arm $h$. A swinging lever K passes through a guide $k$, which is pivotally connected with the swinging lever J, as shown in Figs. 1 and 3. The outer end of the swinging lever K is provided with a cloth-plate K', as shown in Figs. 1 and 2. Near its middle portion the lever K passes through a guide $l$, which is secured upon a strap L. The strap L is secured to a plate A by a screw $m$, and the plate A is provided with a number of adjusting-holes $m'$ to receive the screw $m$, so that the pivotal point of the lever K can be adjusted, as may be necessary.

A post M is secured upon the lever K at its rearward portion, as shown in Figs. 1, 2, and 3. To the upper end of the post M is secured a spring-lever N, which at its outer end is provided with a presser-plate N', which engages with the cloth-plate K'. This cloth-plate K' and presser-plate N' are provided with openings, which are approximately the form of the tack. The cloth in which the tack is to be worked is inserted between the cloth-plate K' and the presser-plate N', with the point of sewing at the openings in the plates K' and N'.

Upon the upper end of the post M is secured a bar O, to which the spring-lever N is secured. Upon this bar O is secured a cam-lever $o$, by which the spring-lever N can be pressed down. The sliding plate F causes the lever H to swing to the right and left alternately upon each stroke of the needle, and the lever H causes the lever J and lever K to swing correspondingly. This causes the lever K to move the plates K' and N' and the cloth, so that the stitches will be taken alternately at the side edges of the openings in the plates K' and N'.

A pitman P is pivotally connected with the bar O at one end and at its other end is pivotally connected with a rotating clutch head or shell P', which is intermittently turned or rotated, as hereinafter explained. The pitman P is pivotally attached to the clutch head or shell by means of a thumb-screw $p$, attached to a suitable clamping device in the clutch head or shell, so that the distance of the pivotal point of the pitman from the center of the clutch head or shell can be adjusted, as may be necessary. The clutch head or shell P' is journaled on the horizontal portion $a'$ of the plate A, and within an annular recess in the lower side of the clutch head or shell is arranged a pair of segments $a^3$, one of which is provided at one end with a pin $b^3$, fitting into a recess in the adjoining end of the other segment, as in Fig. 11. The opposite ends of the segments $a^3$ are provided with a recess or opening $c^3$, which does not extend across the entire width of the segments, thus leaving a projection $c^4$ at each end. A lever R is arranged beneath the clutch head or shell P' and is provided with an oblong pin or stud $d^3$, which projects into the recess or opening $c^3$. A spring $e^3$ is attached at one end to the lever R and at the opposite end to a pin $f^3$, secured to one of the segments $a^3$. When the lever R is moved in the direction of the arrow, Fig. 9, the oblong pin or stud $d^3$ in the recess or opening $c^3$ will force the ends of the segments apart, thereby pressing the exterior faces of the segments $a^3$ against and into clutching contact with the interior of of the clutch head or shell for the purpose of causing the latter to rotate with the segments and lever R. The lever may be rotated in the opposite direction from that indicated by the arrow in Fig. 9 without rotating the clutch head or shell. In consequence of this when the lever R is vibrated or oscillated and intermittent rotary motion is imparted to the clutch head or shell for the purpose of actuating the pitman P the lever R is connected by a link $r$ with an arm S of the rock-shaft C. This arm S is slotted, so that the pivot-screw $s$ of the link $r$ can be adjusted therein to cause the lever to move a greater or less distance at each stroke of the needle-bar $d$. The clutch devices are constructed substantially as described and shown in the Letters Patent No. 432,473, issued to me July 15, 1890. Upon the downward stroke of the needle-bar $d$ the link $r$ and lever R are drawn toward the shaft C, the clutch being disengaged upon that stroke. Upon the upward stroke of the needle-bar the link $r$ and lever R will be moved in the opposite direction, and the clutch, engaging with the head or shell P' at this time, will cause the shell P' to be rotated partially. By adjusting the screw $s$ on the arm S the distance to which the lever R and shell P' will move can be varied, thereby varying the distance through which the pitman P will be moved upon each stroke of the needle, and by adjusting the thumb-screw $p$ on the shell P' the length of movement of the pitman P on each complete rotation of the shell P' can be adjusted. The pitman P therefore causes the levers K and N to be moved longitudinally a short distance upon each movement of the needle-bar upward, thereby moving the cloth between the plates K' and N', so that it is fed properly. This causes the stitches to be taken alternately on opposite sides of the opening and at short distances apart. When the pivotal point of the guide $k$ of the lever K is above the pivot $j'$, the lever K will not be swung to the right or left; but as the lever is moved longitudinally by the pitman P the pivot of the guide $k$ will be moved toward or from the pivot $j'$, thereby causing the lever K to be swung to the right and left a greater or less distance, according to the distance of the pivot of the guide $k$ from the pivot $j'$. By this means the tacks are made in triangular form, as shown in Fig. 8. By adjusting the thumb-screw $p$ the length of the tack can be varied. By adjusting the screw $i$ in the hole $i'$ the width of the tack can be adjusted, and also by adjusting the strap L the width of the tack can be adjusted. By adjusting the screw $s$ on the arm S the distance apart of the several stitches can be adjusted. It will thus be seen that the above device forms a regular tack and the several parts can be adjusted to vary the length and width of the tack and distance apart of the stitches to make a tack of the desired form and size.

What I claim as new, and desire to secure by Letters Patent, is—

1. The combination, with a base-plate A, of a transversely-sliding plate F, means for actuating the latter, a swinging lever K, having at its outer end a cloth-plate K', a cloth-plate N', means for longitudinally reciprocating the swinging lever and cloth-plates, a guide $l$, constituting a pivot for the swinging lever between its ends, devices for adjusting the guide along the swinging lever to vary its pivotal point, a lever H, having an adjustable pivotal connection with the transversely-sliding plate, a lever J, pivoted to the base-plate and provided with an adjustably-pivoted guide $k$ for the inner end of the swinging lever, and a connecting-link $j$ between the levers H and J, substantially as described.

2. The combination, with a base-plate A, having an upright portion $a$, provided with a bolt $e$, of a transversely-sliding plate F, guided by the said bolt, means for actuating the sliding plate, a swinging lever K, having at its outer end a cloth-plate K', a cloth-plate N', means for longitudinally reciprocating the swinging lever and the cloth-plates, a pivotal bearing for the swinging lever between its ends, devices for adjusting the pivotal bearing to vary the pivotal point of the swinging lever, a pivoted lever H, an arm $h$, secured to the transversely-sliding plate and adjustably pivoted to the lever H, a lever J, pivoted to the base-plate and provided with a guide $k$, in which moves the inner end of the swinging lever K, and a link $j$, connecting the levers H and J, substantially as described.

3. The combination of a base-plate A, a transversely-sliding plate F, devices for actuating the sliding plate, a swinging lever K, having at its outer end a cloth-plate K', a cloth-plate N', mechanism for longitudinally reciprocating the swinging lever and the cloth-plates, a pivot-bearing $l$ for the swinging lever between its ends, means for adjusting the pivot-bearing to vary the pivotal point of the swinging lever, a lever H, pivoted to the base-plate and connected with the transversely-sliding plate, a lever J, pivoted intermediate its ends to the base-plate and provided with a guide $k$ for the inner end of the swinging lever, a connecting-link $j$, and means for varying the extent of each movement of the two levers H and J, substantially as described.

4. The combination of a base-plate A, a transversely sliding plate F, means for actuating the sliding plate, a swinging lever K, having at its end a cloth-plate K', a cloth-plate N', an intermittently-rotating clutch-head P', a vibrating clutch-operating lever R, clutch connections between the clutch-operating lever and the clutch-head, a rock-shaft C, having an arm S, a link $r$, connecting the arm of the rock-shaft with the clutch-operating lever, a pitman P, connected with the swinging lever and adjustably engaged with the clutch-head, and connections between the transversely-sliding plate and the swinging lever, substantially as described.

5. The combination of a base-plate A, a transversely-sliding plate F, a swinging lever K, having a cloth-plate K', a cloth-plate N', means for longitudinally reciprocating the swinging lever and the cloth-plates, connections between the inner end of the swinging lever and the transversely-sliding plate, a rotating cam-wheel E, acting on the sliding plate and provided with a ratchet-wheel E', a rock-shaft C, having an arm C', provided with a pawl $e'$ to engage the ratchet-wheel and rotate the cam-wheel, and means for rocking the rock-shaft, substantially as described.

JOHN W. BLODGETT.

Witnesses:
ALBERT H. ADAMS,
JOHN L. JACKSON.